Patented Oct. 28, 1924.

1,513,298

UNITED STATES PATENT OFFICE.

JOHN W. TURRENTINE, OF WASHINGTON, DISTRICT OF COLUMBIA.

THERAPEUTIC PRODUCT AND PROCESS OF PREPARING SAME.

No Drawing.   Application filed January 11, 1923.  Serial No. 612,149.

*To all whom it may concern:*

Be it known that I, JOHN W. TURRENTINE, a citizen of the United States, residing at Cosmos Club, Washington, in the District of Columbia, have invented certain new and useful Improvements in Therapeutic Products and Processes of Preparing Same, of which the following is a specification.

This invention comprises a novel product derived from marine growths, such as kelp, sea-weeds and the like, but preferably from the so-called "giant kelp," *Macrocystis pyrifera;* and the process of its manufacture. The product possesses therapeutic value, especially in the treatment of certain deficiency diseases, and notably goiter. A primary object of this invention is to provide a process whereby the essential components of kelp may be obtained in stable, substantially dehydrated, but yet readily assimilable form.

The giant kelps and kindred marine growths contain a wide variety of saline and other components, existing in both organic and inorganic combination. These components and especially such as contain iodine in assimilable form, are essential to the normal functioning of the human organism, and also to the prevention of certain so-called "deficiency diseases" of which goiter is a type. Raw kelp cannot however be directly utilized by reason not only of the extreme dilution of its therapeutic values, but because of its chemical instability; and ordinary dried kelp is found to have lost much or all of the efficacy of the original substance, owing to decompositions and losses incident to the drying. I have discovered that it is possible, under properly controlled conditions, to prepare from the raw kelp a substantially dehydrated and chemically stable, but readily assimilable and therapeutically active product containing practically all of the therapeutic values of the raw kelp.

In composition this desiccated product is a natural, intimate mixture comprising the elements potassium, sodium, calcium, magnesium, iron, aluminum, chlorine, bromine, iodine, sulfur, phosphorus, silicon and others, in organic and inorganic (saline) combination, suspended in an organic complex of such nature that when wetted it will quickly resume its original jelly-like form and consistence. The wetted product quickly becomes so distributed and disintegrated in watery suspension as readily to yield its organic and inorganic components, so that when taken into the animal stomach and alimentary tract these saline and organic constituents become for the most part soluble, assimilable, and available for the animal metabolism.

The organic constituents of kelp comprise bodies such as the pentosans, galactans, levulans, methyl pentosans, mannans, and especially a body believed to have the empirical formula $C_{21}H_{27}O_{20}$ and herein designated alginic acid. This last mentioned substance is an irreversible gel, soluble in alkalis but insoluble in acids, and is capable of absorbing approximately 60 per cent of its own weight of salts and from 200 to 300 times its weight of water.

These jelly-like substances hold some at least of the saline components in a state of so-called "colloidal suspension." For example Ca and $SO_4$ ions are present, but do not precipitate until hydrolyzed out into a simple aqueous solution. A part of the sulfur is present in organic combinations, and a part of it may be volatilized by steam distillation. Iodine, bromine and phosphorus are similarly held. Nitrogen seems to be present largely in non-proteid combinations, some of which are soluble in water and some in alcohol.

Such of the so-called inorganic components of the desiccated product as are non-volatile or enter readily into non-volatile combinations when the organic menstruum in which they are held is destroyed, for example by heat, appear in familiar combination as indicated by the subjoined analysis of a typical sample. After burning, the ash remaining represented 36% by weight of the original desiccated sample, which may be accepted as indicating its probable minimum saline content. As components of this saline mixture in a specific case were found:

| | |
|---|---|
| Ca | 4.96% |
| Mg | 2.24 |
| Na | 10.52 |
| K | 29.46 |
| $Fe_2O_3 + Al_2O_3$ | 0.43 |
| Cl | 34.93 |
| $SO_4$ | 7.92 |
| $CO_3$ | 4.44 |
| $PO_4$ | 2.30 |
| I | 0.75 |
| Br | Trace |
| | 97.95 |

Traces of other inorganic constituents of sea-water are also to be found. Of these salines the potassium, as chloride, is the one most readily surrendered from its organic suspension, some iodine is given up as iodide, the balance remaining behind in organic combination. Other saline components are liberated only upon destruction of the organic menstruum.

As will readily be understood from the foregoing it is essential that the kelp be dried or otherwise preserved in such manner as neither to lose, destroy or materially alter the natural compounds occurring therein. This is best accomplished by rapidly drying the kelp under controlled and carefully regulated conditions both as regards temperature and the rate of flow of the air or other gas. It is not readily possible to state in definite terms the limiting temperatures and rates of flow or circulation of the drying gases for the reason that these are correlated factors in the sense that the ideal drying conditions are a function of the two, the rate of drying depending both upon the temperature and upon the rate of gas-flow. Essentially the same results may be secured with a volume of gas at a high temperature in slow circulation, as with a volume of gas at lower temperature but in more rapid movement. It is possible however to give certain general instructions which if adhered to will yield a satisfactory product having the essential qualities above detailed.

(1) The kelp must be dried rapidly, since otherwise the salts will leave their natural combinations in the plant tissues and migrate to the surface, where they form feathery or crusty deposits which are easily detached and lost. Such migration of the salts in substantial quantity is to be taken as an indication of too slow an evaporation rate, and may be remedied as stated above by increasing the temperature or rate of flow of the circulating gas, or by both of these expedients.

(2) The temperature of the product during desiccation must be kept below the boiling point of the plant juices. The use of too high a temperature, or too rapid a drying rate, is indicated by the phenomenon known as "stewing," involving the exudation and loss of the plant juices, and the destruction or alteration of the gelatinous nature of the plant structure.

(3) Over-drying should be avoided, as tending to parch the material, to caramelize the sugars and sugar-like bodies, and to alter the natural gelatinous structure of the plant. A residual moisture content of 1% to 5% is usually desirable.

A properly dried frond of the giant kelp may be preserved for months or years, and when immersed in water will swell to its original bulk and assume the appearance of the living kelp.

The desiccated kelp is pulverized in any convenient manner. The powder may be mixed with an agglutinant such as glucose or similar syrup, gum arabic, or a water-soluble alginate such as sodium alginate, whereby it is rendered dustless and less voluminous, permitting the use of smaller containers. In this form it is suitable for use in the kitchen or on the table as a condiment, substituting salt; or it may be mixed with other condiments such as mustard, celery-seed; pepper or the like; or it may be added as an alimentary aid to bakers' products prepared breakfast foods and the like.

The agglutinant likewise serves as a binder, and is useful and probably essential in the manufacture of compressed tablets. For this purpose a 5% solution of glucose in water has proven satisfactory. This is thoroughly mixed in proportion to dampen the mass but not to render it dough-like. The mixture is then dried and ground to a desired fineness, about 1% by weight of commercial "argyrol" or "acto" being added as a lubricant, and the resulting mixture fed to the tablet press. Any other appropriate procedure may of course be employed in forming the tablets, lozenges or the like.

I believe that the therapeutic value of my product is attributable, at least in part, to the presence therein of iodine in organic combinations which are readily assimilable, and which in fact closely resemble those sources, such as fish and other sea foods, from which the supplies of iodine required for the normal functioning of the animal organism are naturally derived.

I am aware that certain sea-weeds and products isolated therefrom, as for instance agar-agar, have been used as articles of diet and the like; but I believe myself to be the first to convert these marine growths into a desiccated product embodying substantially all of the dietary and pharmaceutical values of the raw material in a condition readily assimilable by the animal organism. Also, I believe myself to be the first to recognize the alimentary and medical value of such product.

I claim:

1. The hereindescribed desiccated product derived from kelp or similar marine growths and embodying in assimilable form substantially all of the alimentary and pharmaceutical values of the undried material, said product gelatinizing in presence of water.

2. Process of treating kelp and similar marine growths, comprising effecting rapid dehydration thereof under such controlled temperature conditions as to obtain a desiccated product embodying in assimilable form substantially all of the alimentary and pharmaceutical values of the undried material.

3. As a new article of manufacture, a compressed desiccated product derived from kelp or kindred marine growth comprising in assimilable form substantially all of the alimentary and pharmaceutical values of undried kelp or similar marine growths.

4. As a new article of manufacture, a compressed desiccated product derived from kelp or kindred marine growth comprising in assimilable form substantially all of the alimentary and pharmaceutical values of undried kelp or similar marine growths, and an agglutinant.

In testimony whereof, I affix my signature.

JOHN W. TURRENTINE.